United States Patent [19]

Ramunas

[11] Patent Number: 4,850,762

[45] Date of Patent: Jul. 25, 1989

[54] TOOL SEALING MECHANISM

[75] Inventor: Valdas S. Ramunas, Euclid, Ohio

[73] Assignee: Kennametal Inc., Latrobe, Pa.

[21] Appl. No.: 134,486

[22] Filed: Dec. 17, 1987

[51] Int. Cl.$^4$ .............................................. B23C 9/00
[52] U.S. Cl. ..................................... 409/134; 277/153
[58] Field of Search ............ 409/134; 408/710, 241 R; 277/9, 9.5, 152, 153

[56] References Cited

U.S. PATENT DOCUMENTS

| | | | |
|---|---|---|---|
| 2,257,119 | 9/1941 | Johannesen | 277/9 |
| 2,385,922 | 10/1945 | Judge | 10/119 |
| 2,727,748 | 12/1955 | Benjamin et al. | 279/102 |
| 2,918,290 | 12/1959 | Werstein | 279/19 |
| 3,397,614 | 8/1968 | Meinke | 90/11 |
| 3,447,819 | 6/1969 | Borsum et al. | 277/9 |
| 3,468,553 | 9/1969 | Ashby | 279/97 |
| 3,829,109 | 8/1974 | Koch | 279/91 |
| 3,866,813 | 2/1975 | Arnold | 277/9 |

FOREIGN PATENT DOCUMENTS 0229854 10/1959 Australia .................................. 277/9

Primary Examiner—William L. Sikes
Assistant Examiner—B. R. R. Holloway
Attorney, Agent, or Firm—Thomas R. Trempus

[57] ABSTRACT

A sealing mechanism acts between a quick-change tool holder and a tool adapter receivable therein. The sealing mechanism is an elastomer seal in the form of a V-flange elastomer seal ring mounted on a metal member which has a coaxial cylindrical outer surface and an axially inwardly facing shoulder to establish the elastomer seal member in position. This seal member has a generally conical seal member first portion with an external peripheral surface engaging a planar surface on the quick-change tool holder. This prevents contaminants, such as fine chips, from entering the interior of the quick-change tool holder. The foregoing abstract is merely a resume of the one general application, is not a complete discussion of all principles of operation or applications, and is not to be construed as a limitation on the scope of the claimed subject matter.

12 Claims, 2 Drawing Sheets

TOOL SEALING MECHANISM

BACKGROUND OF THE INVENTION

In many tool holders, there are moving internal parts, and this is especially true with some quick-change, spring-loaded tool holders into which a tool adapter may be coaxially received. With these moving internal parts, under certain operating conditions, such as an environment wherein fine chips are produced by the machine tool, in a short time the quick-change mechanism loses its performance as chips start gathering inside the mechanism. The quick-change tool holder might be a simple construction such as shown in U.S. Pat. No. 2,727,148, or may be one with a more complex internal structure having springs and an internal locking mechanism such as shown in U.S. Pat. No. 3,829,109. At first, the unit becomes sluggish in operation, and later it stops functioning altogether and needs to be overhauled and cleaned.

SUMMARY OF THE INVENTION

The problem to be solved, therefore, is how to construct a sealing mechanism for a tool adapter which may be coaxially received in a quick-change tool holder having internal parts and an axially outwardly facing planar surface normal to the axis of the tool holder.

This problem is solved by a sealing mechanism for a tool adapter coaxially receivable in a quick-change tool holder having internal parts and an axially outwardly facing surface in a plane normal to the axis of the tool holder, said sealing mechanism comprising, in combination, means establishing a coaxial cylindrical surface on said tool adapter, means establishing an axially inwardly facing shoulder on said tool adapter adjacent said cylindrical surface, a coaxial, substantially conical elastomer seal having a large conical angle with an inner peripheral surface frictionally engaging said cylindrical surface and an external peripheral surface substantially in a plane normal to said axis, and means acting axially between said inwardly facing shoulder and said elastomer seal and adapted to urge said external peripheral surface of said seal to engage the outwardly facing surface of the quick-change tool holder to prevent contaminants such as fine chips from entering the interior of the quick-change tool holder.

Accordingly, an object of the invention is to provide a sealing mechanism which seals between a tool adapter and a quick-change tool holder to prevent contaminants from entering the internal parts of the quick-change tool holder.

Other objects and a fuller understanding of the invention may be had by referring to the following description and claims, taken in conjunction with the accompanying drawing.

DESCRIPTION OF THE PREFERRED EMBODIMENTS

Figure 1:
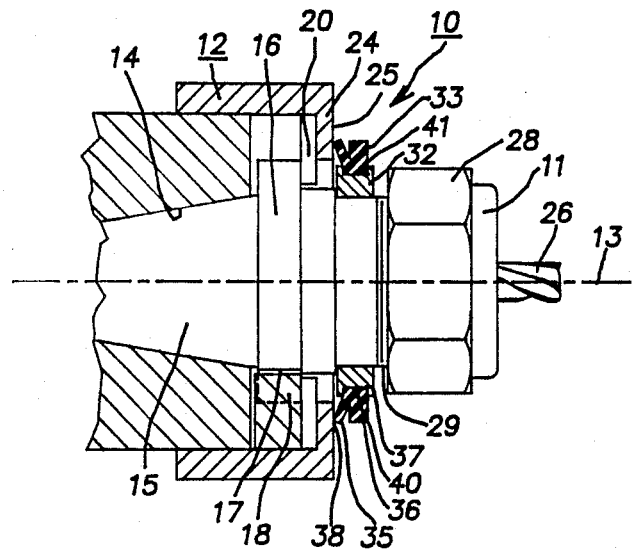
FIG. 1 is a longitudinal, sectional view of a first embodiment of the invention.
Figure 1A:
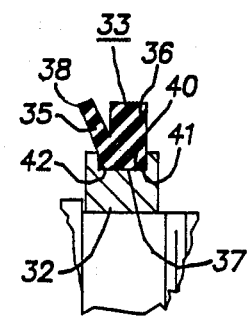
FIG. 1A is an enlarged view of part of FIG. 1.

FIG. 1 illustrates a sealing mechanism 10 for a tool adapter 11 which is coaxially receivable in a quick-change tool holder 12. This quick-change tool holder has an axis 13 and a socket 14. This socket may be cylindrical, but is shown as a conical, tapered socket 14. This socket receives a complementary conical male section 15 of the tool adapter 11. The tool adapter additionally has a flange 16 with two diametrically opposite notches therein, one notch 17 being shown, and it receives a drive key 18 on the quick-change tool holder to impart torque from the tool holder 12 to the tool adapter 11. The quick-change tool holder 12 also may include moving internal parts, such as a spring and a trigger (not shown), so that a latch 20 snaps into position on the axially outboard side of the flange 16, hence locking the tool adapter 11 in the quick-change tool holder 12. The quick-change tool holder 12 further includes an inwardly turned flange 24 which forms a generally annular, axially outwardly facing planar surface 25, which is normal to the axis 13.

The tool adapter 11 is adapted to mount various tools 26 of different sizes, so that using the tool adapter 11, these many different sizes of tools may be readily mounted in the quick-change tool holder 12. As an example of holding such tools, the tool adapter 11 has a nut 28 threaded onto a male thread 29 to squeeze a collet onto the tool 26.

The sealing mechanism 10 includes generally a metal member 32 and an elastomer seal member 33. The seal member 33 has first and second portions 35 and 36 which are unitarily attached. The seal member 33 may be in the form of a V-flange, with the first portion being a coaxial, substantially conical elastomer seal with a large conical angle. This seal member has an inner peripheral surface 37 which frictionally engages the metal member 32 and also has an outer peripheral surface terminating in an edge 38 which is substantially in a plane normal to the axis 13.

The metal member has an outer, cylindrical surface 40 coaxial with axis 13, and has an axially inwardly facing shoulder 41. The metal member 32 further has an axially outwardly facing shoulder 42, and the two shoulders 41 and 42, together with the outer cylindrical surface 40, establish an annular recessed groove in the outer periphery of this metal member 32. The metal member 32 may be a continuous annular ring, and may be slipped over the male threads 29 and held in place by soldering, by setscrews, or by a shrink fit.

In use, the tool adapter 11 with tool 13 may be manually inserted into the quick-change tool holder 12. During the final insertion movement, usually some trigger or release pin is engaged by a part of the tool adapter, such as the flange 16, and consequently a latch 20, such as a latch ring, is urged by springs into engagement with the outer surface of the flange 16 to lock the tool adapter in place in the quick-change tool holder. The metal member 32 and seal member 33 are so placed on the tool adapter 11 that as the male section 15 seats in the socket 14, the outer peripheral surface 38 of the seal member 33 is yieldingly urged against the outwardly facing planar surface 25 of the quick-change tool holder. The second portin 36 of the elastomer seal ring is a means acting between the inwardly facing shoulder 41 and the first portion 35 of the seal member 33. This establishes the yielding engagement of the seal member against the quick-change tool holder to prevent contaminants, such as fine chips, from entering the interior of the quick-change tool holder. The mass of the second portion 36 of the seal member 23 is greater than the mass of the first portion, and imparts greater stiffness to the conical first portion 35 to aid in assuring engagement of the conical seal first portion with the quick-change tool holder under various operating conditions. Both the first and second portions of the seal member 33 act as a slinger ring to sling oil and contaminants away from the sealing surface under revolving tool applications.

Figure 2:
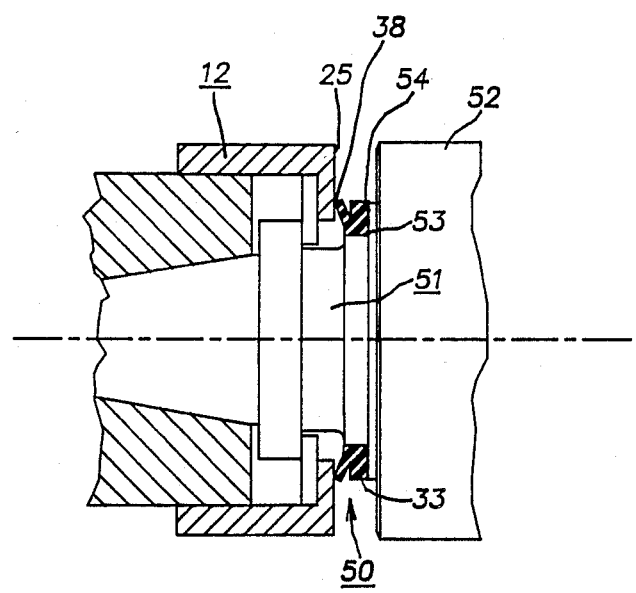
FIG. 2 is a longitudinal, sectional view of a second embodiment of the invention.

FIG. 2 shows a longitudinal, sectional view of a second embodiment of the sealing mechanism 50, wherein a large diameter tool 52 is mounted on the tool adapter 51, which may be received in the quick-change tool holder 12. In this case, the tool adapter 51 itself is provided with the outer cylindrical surface 53, and contiguous with it the axially inwardly facing shoulder 54. This surface 53 and shoulder 54 are positioned such that the same elastomer seal member 33 as in FIG. 1 may be used, held in place by friction of the inner peripheral surface 37 on the cylindrical surface 53, and with the outer peripheral surface 38 adapted to yieldingly engage the axially outwardly facing planar surface 25 of the quick-change tool holder 12. The cylindrical surface 53 and the shoulder 54 may be either on the tool adapter 51 or on the tool 52 to establish the seal member 33 in the proper position.

Figure 3:
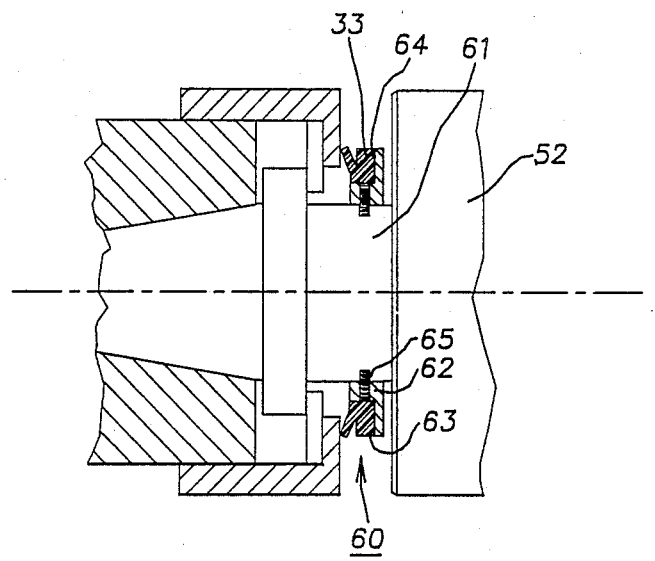
FIG. 3 is a longitudinal, sectional view of a third embodiment of the invention.

FIG. 3 shows a longitudinal, sectional view of a third embodiment of the invention. In this case, the sealing mechanism 60 includes the same elastomer seal member 33 used with the large diameter tool 52 in a tool adapter 61. The elastomer seal member 33 is mounted on a metal member 62, which has an outer cylindrical surface 63 and an axially inwardly facing shoulder 64. The metal member 62 may be an annular ring if it may be placed on the tool adapter 61 prior to the tool 52 being installed and may be held by setscrews 65 into the tool adapter 61. If the metal member cannot be slid over the tool adapter as an annular member, it may then be constructed in two semicircular portions, each held in place by the setscrews 65.

Figure 4:
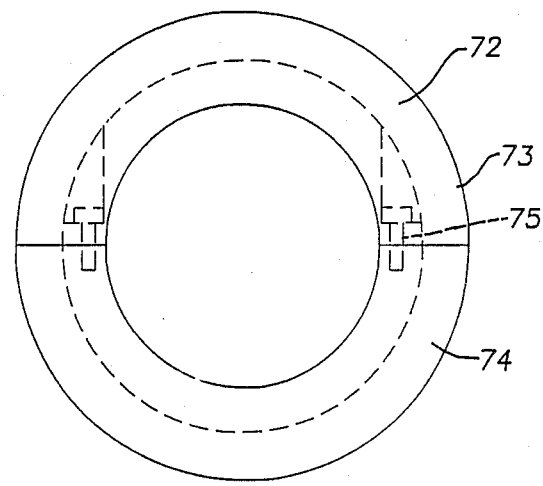
FIG. 4 is an elevational view of a split collar used on the embodiments of FIGS. 2 or 3.

FIG. 4 shows an alternative construction of a metal member 72 which is formed into first and second semicircular pieces 73 and 74, held together by machine screws 75 after assembly on the tool adapter. This construction may be used with any of the embodiments of FIGS. 1, 2, or 3.

In all of the embodiments, the V-flange elastomer seal has the first portion which engages both the outer cylindrical surface on the tool adapter and the planar surface on the quick-change tool holder. This is a yielding engagement, aided by the greater mass of the second portion of the seal member. Not only does the second portion 36 of the seal member have greater mass than the first portion, it provides stiffness and better shape retention to the first portion and also acts between that first portion and the inwardly facing shoulder 41, 54, or 64 to assure the yielding engagement of the seal member with the quick-change tool holder.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A sealing mechanism for a tool adapter coaxially receivable in a quick-change tool holder having movable internal parts subject to contamination and an axially outwardly facing surface in a plane normal to the longitudinal axis of the tool holder, said sealing mechanism comprising, in combination:
    means establishing a cylindrical surface on said tool adapter coaxial with said longitudinal axis thereof;
    means establishing an axially inwardly facing shoulder on said tool adapter adjacent said cylindrical surface;
    a coaxial substantially conical elastomer seal having a large conical angle with an inner peripheral surface frictionally engaging said cylindrical surface on said tool adapter and an external conical peripheral surface with an edge, said edge being substantially in a plane normal to said axis;
    said elastomer seal having a V-shape in cross section with the open end of the V facing radially outwardly; and
    said elastomer seal including means acting axially between said inwardly facing shoulder and said edge of said elastomer seal and adapted to urge said edge of said external conical peripheral surface of said seal axially to engage the outwardly planar facing surface of the quick-change tool holder to prevent contaminants such as fine chips from entering the interior of the quick-change tool holder.

2. A sealing mechanism as set forth in claim 1, wherein said substantially conical elastomer seal is a first portion of a seal member, and a second portion of said seal member establishes said axially acting means.

3. A sealing mechanism as set forth in claim 2, wherein said second portion of said seal member is an elastomer ring disposed substantially in a plane normal to said axis.

4. A sealing mechanism as set forth in claim 2, wherein said second portion of said seal member is unitary with said first portion.

5. A sealing mechanism as set forth in claim 4, wherein said second portion of said seal member has a greater mass than said first portion and imparts greater stiffness to said conical first portion to aid in assuring engagement of said external peripheral surface of said conical seal with the outwardly facing surface of the quick-change tool holder.

6. A sealing mechanism as set forth in claim 1, including a metal member having said cylindrical surface and said shoulder thereon.

7. A sealing mechanism as set forth in claim 6, including means to mount said metal member coaxially on said tool adapter.

8. A sealing mechanism as set forth in claim 1, wherein said cylindrical surface and said shoulder are contiguous.

9. A sealing mechanism as set forth in claim 1, including an axially outwardly facing shoulder on said tool adapter adjacent said cylindrical surface.

10. A sealing mechanism as set forth in claim 9, wherein said two shoulders and said cylindrical surface form an annular groove facing radially outward and receiving said elastomer seal.

11. A sealing mechanism as set forth in claim 10, including a metal member having said annular groove therein.

12. A sealing mechanism as set forth in claim 11, including first and second generally semicircular parts securable to said tool adapter to form said metal member.

* * * * *